United States Patent [19]

Linzenkirchner

[11] Patent Number: 5,809,487
[45] Date of Patent: Sep. 15, 1998

[54] ARRANGEMENT FOR MODELING A NON-LINEAR PROCESS

[75] Inventor: Edmund Linzenkirchner, Eggenstein-Leopoldshafen, Germany

[73] Assignee: Siemens Aktiengesellschaft, München, Germany

[21] Appl. No.: 583,100

[22] PCT Filed: Jul. 6, 1994

[86] PCT No.: PCT/DE94/00776

§ 371 Date: Jan. 16, 1996

§ 102(e) Date: Jan. 16, 1996

[87] PCT Pub. No.: WO95/02855

PCT Pub. Date: Jan. 26, 1995

[30] Foreign Application Priority Data

Jul. 13, 1993 [DE] Germany .......................... 43 23 439.9

[51] Int. Cl.⁶ .............................................. G06F 15/18
[52] U.S. Cl. .................................. 706/10; 706/3; 706/52; 706/16
[58] Field of Search .................................. 395/22, 11, 3, 395/51, 61

[56] References Cited

U.S. PATENT DOCUMENTS

| | | | |
|---|---|---|---|
| 5,046,019 | 9/1991 | Basehore | 395/11 |
| 5,255,344 | 10/1993 | Takagi et al. | 395/3 |
| 5,465,320 | 11/1995 | Enbutsu et al. | 395/22 |

FOREIGN PATENT DOCUMENTS

| | | | |
|---|---|---|---|
| 3291729 | 12/1991 | Japan | G06F 9/44 |

OTHER PUBLICATIONS

Proceedings of the 1992 American Control Conference, vol. 1, Jun. 1992, Chicago, US, pp. 475–479, M.A. Kramer et al.: *Embedding Theoretical Models in Neural Networks*.

Second IEEE International Conference on Fuzzy Systems, vol. 1, Apr. 1993, San Francisco, US, pp. 321–326, B. Freisleben et al.: *Combining Fuzzy Logic and Neural networks to Control an Autonomous Vehicle*.

Proceedings of the 1992 American Control Conference, vol. 3, Jun. 1992, Chicago, US, pp. 1917–1921, D.C. Psichogios et al.: *Process Modeling Using Structured Neural Networks*.

Neural Networks, vol. 6, No. 4, 1993, Elmsford, US, pp. 485–497, H. Gomi et al.: *Recognition of Manipulated Objects by Motor Learning with Modular Architecture Networks*.

*Neuronale Netzwerke*, Eberhard Schöneburg et al., published by Markt & Technik Verlag, 1990.

Dash et al, "A Fuzzy Adaptive Correction Scheme of Short Term Load Forecasting Using Fuzzy Layered Neural Network" Applications of Neural Networks to Power Systems, 1993 Forum, IEEE 1993.

Ikonomopoulos et al, "Measurement of Fuzzy Values Using Artificial Neural Networks and Fuzzy Arithmetic", IEEE International Conference on Fuzzy Systems, Mar.–Apr. 1993.

Wong FS, "Fuzzy Neural Systems for Decision Making", IEEE International Conference on Neural Network, 1991.

*Primary Examiner*—George B. Davis
*Attorney, Agent, or Firm*—Kenyon & Kenyon

[57] ABSTRACT

An arrangement for modeling a non-linear process including at least one input variable (x1, x2) and at least one output variable (y) can include a neural network and a device for specifying functional (or operational) values. A function of the neural network is determined in a first part of the domain of input variables (x1, x2) by learning from measuring data, which are obtained from the process by acquiring measured values. An empirically based device for specifying functional (or operational) values, preferably a fuzzy system, is provided in a second part of the domain of input variables (x1, x2) in which there are no measuring data for training the neural network. This arrangement is particularly useful when it is implemented in controllers.

9 Claims, 1 Drawing Sheet

ARRANGEMENT FOR MODELING A NON-LINEAR PROCESS

BACKGROUND OF THE INVENTION

The present invention relates to an arrangement for modeling a non-linear process having at least one input variable and at least one output variable, comprising a neural network.

As is known, for example, from the book by Eberhard Schbneburg, Nikolaus Hansen and Andreas Gawelczyk "Neuronale Netzwerke" [Neural Networks], published in 1990 by Markt Technik Publishers, neural networks can be used to simulate complex, non-linear functions having many input and output variables by training them on the basis of learning data. This ability can be utilized to model the static, non-linear behavior of the process on the basis of measuring data acquired from a process. In this manner, one obtains a process model which is realized by the non-linear output function of the neural network and can be used to improve the process control in a closed-loop control system. However, when acquiring measuring data from the real process, the problem occurs that generally not all possible process states can be run through. The output data and, thus, also the function learned by the neural network are, therefore, also only valid in those operating states for which ample measuring data are available. If new process states occur during the current operation, then unforeseeable interventions in the process can lead to critical or even unacceptable states when the neural network is used for the closed-loop or open-loop control of the process.

SUMMARY OF THE INVENTION

The present invention creates an arrangement which will avoid the mentioned disadvantages when a neural network is used to model a non-linear process.

The present invention provides a new arrangement for modeling a nonlinear process having at least one input variable (x1, x2) and at least one output variable (y). The arrangement for modeling the non-linear process includes a neural network (1), whose function is determined in a first part of the domain of input variables (x1, x2) by learning from measuring data, which are obtained from the process by acquiring measured values. The arrangement additionally includes a device for specifying functional (operational) values in a second part of the domain of input variables (x1, x2) in which there are no measuring data for training the neural network (1).

In an alternative embodiment of the present invention, in the second part of the domain of input variables, the device for specifying functional values includes a device for monitoring the input variables (x1, x2) when they leave the first part of the domain of input variables. In this embodiment, the device for specifying functional values additionally includes a controllable gate (9) which is controlled by the monitoring device. In response to input variables in the second part of the domain, the controllable gate switches over to the specification (setpoint entry) of functional values.

In another embodiment of the present invention, in the second part, the device for specifying functional values is a fuzzy system. Membership of the values of the input variables (x1, x2) in the first part is characterized by membership functions (14, 15) and, in response to input variables in the second part, the values of the output variables (y) are specified in the manner of fuzzy logic.

In a further embodiment of the present invention, the membership functions (14, 15) are determined by the rate of occurrence of the values of the input variables (x1, x2) when measured values are acquired.

In an additional embodiment of the present invention, in the second part of the domain of the input variables (x1, x2) and in the domain of the output variables (y), other membership functions (16, 17, 18, 19, 20, 21, 22, 23) are defined for linguistic values. In the controlling mechanism (action), the behavior of the process is simulated empirically by IF/THEN rules on the basis of the linguistic values.

An additional embodiment of the present invention provides that the device for specifying functional values in the second part is a fuzzy system. The process behavior is simulated empirically in the second part of the domain of the input variables and in the domain of the output variables. The function of the neural network in the second part of the domain of the input variables is determined by learning from the specified values that were acquired by the fuzzy system.

Alternatively, in another embodiment of the present invention, an arrangement for modeling a non-linear process includes at least one input variable (x1, x2) and at least one output variable (y), a neural network (1) a fuzzy system, and a controllable gate (9). The neural network (1) has a function determined in a first part of the domain of input variables (x1, x2) by learning from measuring data, which are obtained from the process by acquiring measured values. The system specifies functional (operational) values in a second part of the domain of input variables (x1, x2) in which there are no measuring data for training the neural network (1). In the fuzzy system, the membership of the values of the input variables (x1, x2) in the first part are specified membership functions (14, 15). The controllable gate (9) is controlled by the fuzzy system. In response to input variables in the second part of the domain, the controllable gate (9) switches over to the specification (setpoint entry) of functional values by the fuzzy system, in the second part of the domain of the input variables (x1, x2) and in the domain of the output variables (y), other membership functions (16, 17, 18, 19, 20, 21, 22, 23) being defined for linguistic values and, in the controlling mechanism, the behavior of the process being simulated empirically by IF/THEN rules on the basis of the linguistic values.

Upon leaving the first part of the domain (range of values) of input variables covered by the measuring data, the input signals of the neural network are monitored. The response to this monitoring can then be used to switch over to another device to specify uncritical functional operational values of the output variables. An alternative method is for the neural network to learn both from the measuring data existing in the first part, as well as from the values of the output variables specified in the second part, in order to then be able to output uncritical values for the output variables in the entire domain of input variables.

The invention has the advantage that measuring data only have to be acquired within a range of process states that can be realized with a justifiable outlay (or degree of complexity) and that, in the remaining range, uncritical values for output variables can be produced, it being possible to also introduce empirical knowledge about the other process states. Therefore, the function of the arrangement is not limited to the states measured in the real process.

BRIEF DESCRIPTION OF THE DRAWINGS

On the basis of the attached drawings, in which one exemplary embodiment of the present invention is illustrated, the present invention, as well as embodiments and advantages thereof, are elucidated in the following description.

DETAILED DESCRIPTION

Figure 1:
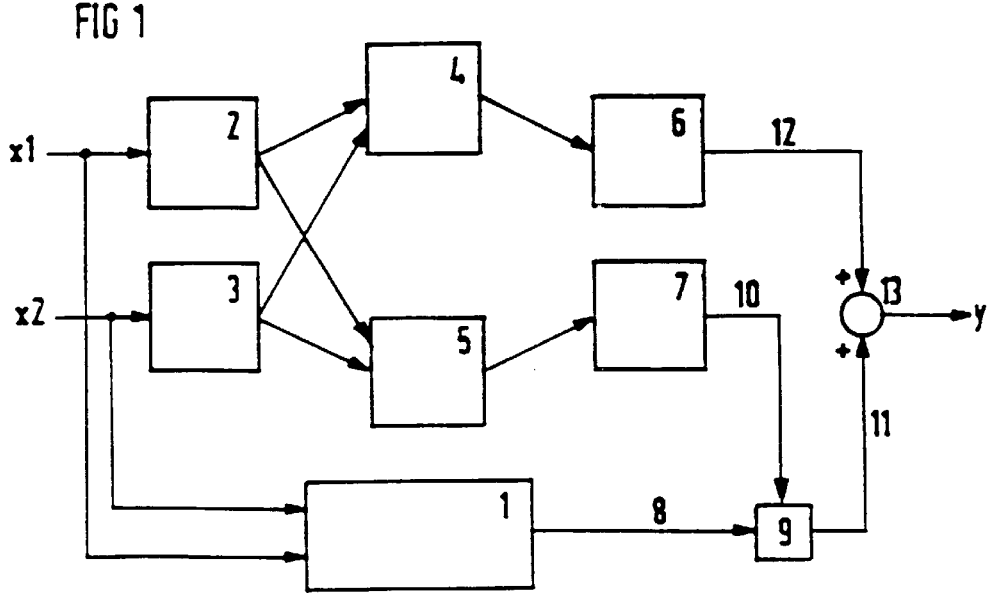
FIG. 1 illustrates an arrangement according to an embodiment of the present invention which includes a neural network and a fuzzy system.

A fuzzy system and a trained neural network 1 are combined in FIG. 1. The fuzzy system includes two fuzzification modules 2 and 3 for input variables x1 or x2, as well as modules 4 and 5 of a controlling mechanism having downstream defuzzification modules 6 and 7. Integrated in the fuzzy system are not only the rules for actually simulating the process, but in the part of the domain of the input variables x1 and x2, in which no measuring data exist, also such rules which switch off the neural network 1 or attenuate its output signal 8. To this end, a controllable gate 9 is provided, which is activated by an output signal 10 from the defuzzification module 7. Thus, the gate 9 closes at the very moment that the active process state leaves the range for which the neural network 1 was trained. In the arrangement according to FIG. 1, an output signal y is formed by a summing element 13 by superimposing an output signal 11 from the controllable gate 9 and an output signal 12 from the defuzzification module 6.

A method for designing an arrangement according to FIG. 1 shall be described in the following on the basis of FIG. 2 through FIG. 6. The measuring data intended to be used for later training (or learning) of the neural network are acquired from the real process by acquiring measured values and are stored as ordered data sets, in each case together with all contemporaneously sampled values of the input and output variables. As many process variables as possible are taken into consideration when acquiring the measured values, particularly when there is no detailed knowledge of the internal structure of the process. Along with these, input signals may also be detected which are not relevant to the forming of the desired output signals or which are redundant. To exclude such input signals from further evaluation, data analysis methods (e.g., a correlation computation or a training and comparison of networks) may be applied to the data sets, in each case while leaving out inputs. By correlating input signals among themselves or input and output signals, it can be determined which input signals hold the same useful information and which have an effect on output signals. If one recognizes, for example, that an input signal has no effect on the output signals, then there is no need to consider it further. Another way to reduce input signals is to repeatedly train neural networks, in each case leaving out one of the input signals.

Figure 2:
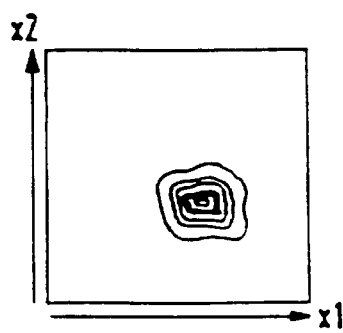
FIG. 2 illustrates a diagram of the rate of occurrence of values of the input variables x1 and x2 of a real process.
Figure 3:
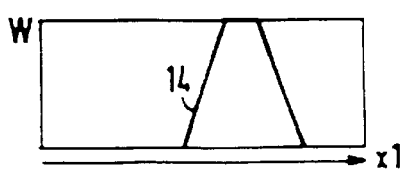
FIG. 3 and FIG. 4 illustrate derived membership functions for the input variables x1 and x2.
Figure 4:
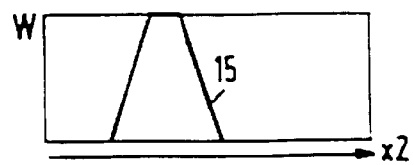

FIG. 2 depicts a contour line diagram determined on the basis of the data sets for the rate of occurrence of value pairs of the input variables x1 and x2. In regions or areas with high rates of occurrence, one can expect a good simulation of the process when training the neural network. They make up a first part of the domain of the input variables x1 and x2 in which there is a sufficient number of measuring data. On the other hand, there are no measuring data in a second part situated outside of the depicted contour lines. For each individual input variable, frequency distributions result from the measuring data, whose characteristic curve corresponds in principle to the membership functions 14 and 15 for the input variables x1 and x2 depicted in FIG. 3 and FIG. 4. The domains of the input variables x1 or x2 are plotted on the abscissae, the truth value w on the ordinates. In combination with one another, both membership functions 14 and 15 describe those process states contained in the measuring data which are covered by the neural network 1. The membership functions for the output signal y (FIG. 1) of the process are established in the same way.

Figure 5:
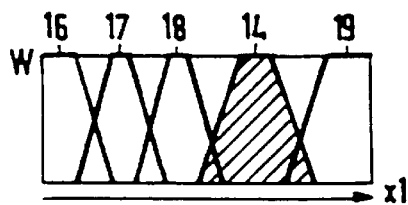
FIG. 5 and FIG. 6 illustrate the diagrams according to FIG. 3 and FIG. 4, supplemented by further membership functions.
Figure 6:
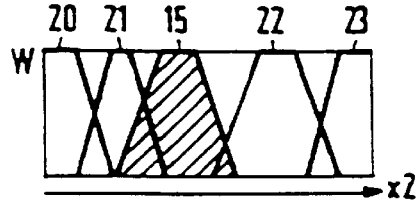

In another step, in addition to the membership functions 14 and 15, other membership functions 16, 17, 18, 19, as well as 20, 21, 22, 23 may be defined for the input variable x1 or the input variable x2 in accordance with FIG. 5 and FIG. 6. This definition is made empirically (i.e., the domains of the individual variables are subdivided into meaningful subdomains in conformance with the stipulations or setpoint selections of an experienced process operator). The membership functions are defined so that each possible process state is covered by at least one membership function. The membership functions 18 and 19 or 21 and 22 and, bordering on these membership functions, the membership functions 14 or 15 that ensued from the measuring data, should advantageously overlap one another, so as to guarantee a smooth transition. As a special case not shown in this exemplary embodiment, subdomains that are sharply delimited from one another may also be defined by rectangular membership functions.

The membership functions are defined in the same way for the output variable y of the process.

Starting out from the membership functions that are now available for all process states, the process behavior is introduced to module 4 of the controlling mechanism (FIG. 1) for all those process states which are not covered by corresponding measuring data. The result is a fuzzy system which realizes an empirical process model for all process states not covered by the neural network.

Alternatively to the arrangement depicted in FIG. 1, it is also possible for a fuzzy system according to an embodiment of the present invention and devised in accordance with the method described above to generate auxiliary data to supplement the original set of measuring data so as to cover all process states. This supplemented data set can then be used to train a neural network, which also models the range of process states expanded by the fuzzy system.

What is claimed is:

1. An arrangement for modeling a non-linear process having at least one input variable and at least one output variable, comprising:

a neural network whose function is determined in a first part of a domain of the at least input variable by learning from measuring data, which are obtained from the non-linear process by acquiring measured values; and a device for specifying functional values in a second part of the domain of the at least one input variable in which there are no measuring data for training the neural network, wherein in the second part, the monitoring device for specifying functional values contains a device for monitoring the at least one input variable when they leave the first part, as well as a controllable gate which is controlled by the monitoring device and, in response to the at least one input variable in the second part of the domain, switches over to a specification (setpoint entry) of functional values.

2. The arrangement for modeling a non-linear process according to claim 1, wherein in the second part, the device for specifying functional values is a fuzzy system, in which the membership of the values of the at least one input variable in the first part is characterized by membership functions and which, in response to at least one input variable in the second part, specifies the values of the at least one output variable using fuzzy logic.

3. The arrangement for modeling a non-linear process according to claim 2, wherein the membership functions are determined by a rate of occurrence of the values of the at least one input variable when measured values are acquired.

4. The arrangement for modeling a non-linear process according to claim 3, wherein in the second part of the domain of the at least one input variable and in the domain of the at least one output variable, other membership functions are defined for linguistic values; and in the controlling mechanism, behavior of the process is simulated empirically by IF/THEN rules based on the linguistic values.

5. The arrangement for modeling a non-linear process according to claim 2, wherein in the second part of the domain of the at least one input variable and in the domain of the at least one output variable, other membership functions are defined for linguistic values; and in the controlling mechanism, behavior of the process is simulated empirically by IF/THEN rules based on the linguistic values.

6. The arrangement for modeling a non-linear process according to claim 2, wherein the membership functions are determined by a rate of occurrence of the values of the at least one input variable when measured values are acquired.

7. The arrangement for modeling a non-linear process according to claim 6, wherein in the second part of the domain of the at least one input variable and in the domain of the at least one output variable, other membership functions are defined for linguistic values; and in the controlling mechanism, behavior of the non-linear process is simulated empirically by IF/THEN rules based on the linguistic values.

8. The arrangement for modeling a non-linear process according to claim 2, wherein in the second part of the domain of the at least one input variable and in the domain of the at least one output variable, other membership functions are defined for linguistic values; and in the controlling mechanism, behavior of the process is simulated empirically by IF/THEN rules based on the linguistic values.

9. An arrangement for modeling a non-linear process including at least one input variable and at least one output variable, comprising:

a neural network whose function is determined in a first part of a domain of the at least one input variable by learning from measuring data, which are obtained from the non-linear process by acquiring measured values;

a fuzzy system which creates a specification of functional values in a second part of the domain of the at least one input variable in which there are no measuring data for training a neural network, in the fuzzy system, a membership of the values of the at least one input variable in the first part being specified membership functions; and a controllable gate which is controlled by a controlling mechanism of the fuzzy system and which, in response to at least one input variable in the second part of the domain, switches over to the specification of functional values by the fuzzy system, in the second part of the domain of the at least one input variable and in the domain of the at least one output variable, other membership functions being defined for linguistic values and, in the controlling mechanism, behavior of the non-linear process being simulated empirically by IF/THEN rules based on the linguistic values.

* * * * *